(12) United States Patent
Henry et al.

(10) Patent No.: US 9,074,542 B2
(45) Date of Patent: Jul. 7, 2015

(54) METHOD AND SYSTEM FOR CONTROLLING AN ENGINE DURING TUNNELING OPERATION

(75) Inventors: Luke Henry, Lawrence Park, PA (US); James Robert Mischler, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 1021 days.

(21) Appl. No.: 13/186,641

(22) Filed: Jul. 20, 2011

(65) Prior Publication Data

US 2013/0024086 A1   Jan. 24, 2013

(51) Int. Cl.
*F02M 25/03* (2006.01)
*F02D 41/02* (2006.01)
*F02D 41/14* (2006.01)
(Continued)

(52) U.S. Cl.
CPC .......... *F02D 41/021* (2013.01); *F02D 41/1438* (2013.01); *F02D 41/144* (2013.01); *F02D 41/1454* (2013.01); *F02D 41/146* (2013.01); *F02D 13/0269* (2013.01); *F02D 41/005* (2013.01); *F02D 2041/001* (2013.01);
(Continued)

(58) Field of Classification Search
CPC ..... Y02T 10/47; Y02T 10/121; Y02T 10/144; Y02T 10/18; Y02T 10/26; Y02T 10/42; Y02T 10/44; Y02T 10/40; Y02T 10/123; Y02T 10/146; Y02T 10/32; Y02T 10/46; Y02T 10/128; Y02T 10/16; Y02T 10/142; F02B 47/08; F02B 29/0406; F02B 2075/125; F02B 37/00; F02B 1/12; F02B 29/0412; F02B 37/007; F02B 37/18; F02B 3/06; F02B 47/10; F02B 17/005; F02B 2275/36; F02B 23/0657; F02B 23/104

USPC ........ 701/101, 102, 103, 104, 105, 108, 109, 701/19; 123/568.15, 568.21, 568.22, 123/568.31, 435, 672, 676, 677, 678, 679, 123/686, 689, 703, 704; 60/605.2, 278, 60/277, 279, 274; 73/114.31, 114.34, 73/114.69, 114.71, 114.72, 114.73, 114.74
See application file for complete search history.

(56) References Cited

U.S. PATENT DOCUMENTS 4,698,761 A * 10/1987 Cooper et al. ................... 701/19
4,718,352 A *  1/1988 Theurer et al. ............... 105/62.1
(Continued)

FOREIGN PATENT DOCUMENTS

GB        2418228 A    3/2006
JP       56138433 A   10/1981
(Continued)

OTHER PUBLICATIONS

U.S. Appl. No. 12/816,063 pp. 1-44.
(Continued)

*Primary Examiner* — Hai Huynh
*Assistant Examiner* — Raza Najmuddin
(74) *Attorney, Agent, or Firm* — GE Global Patent Operation; John A. Kramer

(57) ABSTRACT

Various methods and systems are provided for an engine in a vehicle, the engine having an intake and an exhaust. In one example, a method includes determining the vehicle is under tunneling operation in response to one or more of an intake gas constituent and an exhaust gas constituent. The method further comprises adjusting one or more operating parameters in response to the determination of tunneling operation.

22 Claims, 4 Drawing Sheets

(51) Int. Cl.
*F02D 41/00* (2006.01)
*F02D 13/02* (2006.01)
*F02M 25/07* (2006.01)

(52) U.S. Cl.
CPC .............. *Y02T10/142* (2013.01); *Y02T 10/47* (2013.01); *F02M 25/0752* (2013.01); *F02D 13/0265* (2013.01)

(56) References Cited

U.S. PATENT DOCUMENTS

| | | | |
|---|---|---|---|
| 5,425,338 A * | 6/1995 | Gottemoller | 123/358 |
| 5,561,602 A * | 10/1996 | Bessler et al. | 701/1 |
| 5,703,777 A * | 12/1997 | Buchhop et al. | 701/109 |
| 6,055,810 A * | 5/2000 | Borland et al. | 60/600 |
| 6,079,251 A * | 6/2000 | Gaultier et al. | 73/23.31 |
| 6,325,050 B1 | 12/2001 | Gallagher et al. | |
| 6,666,201 B1 * | 12/2003 | Mazur | 123/698 |
| 6,820,599 B2 * | 11/2004 | Kurtz et al. | 123/568.21 |
| 6,880,524 B2 | 4/2005 | Gates et al. | |
| 6,935,310 B2 * | 8/2005 | Viele et al. | 123/406.27 |
| 7,021,220 B2 | 4/2006 | Harada et al. | |
| 7,072,747 B2 * | 7/2006 | Armbruster et al. | 701/19 |
| 7,198,038 B2 | 4/2007 | McClain | |
| 7,284,366 B2 * | 10/2007 | Kurtz | 60/277 |
| 7,314,041 B2 | 1/2008 | Ogawa et al. | |
| 7,334,573 B2 * | 2/2008 | Shiraishi et al. | 123/568.14 |
| 7,349,797 B2 * | 3/2008 | Donnelly et al. | 701/115 |
| 7,778,766 B1 * | 8/2010 | Cowgill et al. | 701/108 |
| 7,991,539 B2 * | 8/2011 | Enomoto et al. | 701/109 |
| 8,412,451 B2 * | 4/2013 | Johnson | 701/400 |
| 8,479,716 B2 * | 7/2013 | Ide et al. | 123/568.19 |
| 8,666,640 B2 * | 3/2014 | Nakatani et al. | 701/108 |
| 2003/0225503 A1 * | 12/2003 | Mazur | 701/108 |
| 2004/0149274 A1 * | 8/2004 | Kurtz et al. | 123/672 |
| 2005/0251299 A1 * | 11/2005 | Donnelly et al. | 701/19 |
| 2007/0130947 A1 | 6/2007 | Baumgard et al. | |
| 2007/0215126 A1 * | 9/2007 | Shiraishi et al. | 123/568.14 |
| 2009/0112447 A1 * | 4/2009 | Ishizuka et al. | 701/109 |
| 2010/0108045 A1 * | 5/2010 | Enomoto et al. | 123/674 |
| 2010/0175674 A1 * | 7/2010 | Vennettilli et al. | 123/703 |
| 2010/0211293 A1 * | 8/2010 | Yamada et al. | 701/108 |
| 2011/0054763 A1 * | 3/2011 | Oehlerking | 701/108 |
| 2013/0118461 A1 * | 5/2013 | Mitchell et al. | 123/681 |
| 2013/0197785 A1 * | 8/2013 | Bhasham et al. | 701/104 |
| 2014/0209072 A1 * | 7/2014 | Nakada | 123/568.11 |

FOREIGN PATENT DOCUMENTS

| | | |
|---|---|---|
| JP | 07117669 A | 9/1995 |
| JP | 10329717 A | 12/1998 |
| WO | 0108958 A1 | 2/2001 |
| WO | 2011017272 A1 | 2/2011 |

OTHER PUBLICATIONS

Search Report and Written Opinion from corresponding PCT Application No. PCT/US2012/046021 dated Nov. 21, 2012.

* cited by examiner

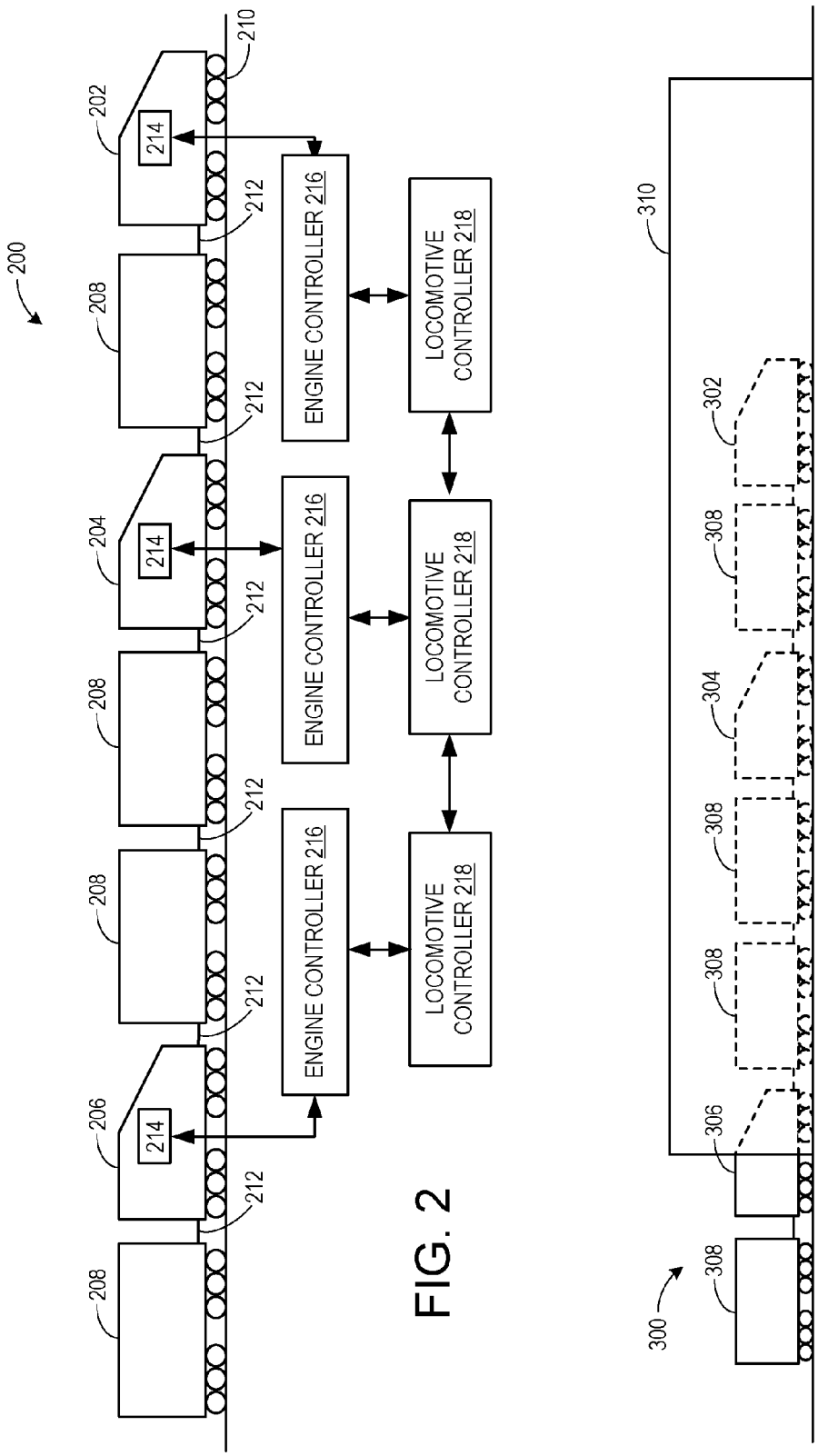

METHOD AND SYSTEM FOR CONTROLLING AN ENGINE DURING TUNNELING OPERATION

FIELD

Embodiments of the subject matter disclosed herein relate to methods and systems for controlling operation of an internal combustion engine during tunneling operation.

BACKGROUND

Some vehicles, such as rail vehicles, may undergo tunneling operation in which the vehicle travels through a confined space, such as a tunnel. During tunneling operation, temperatures of various systems of the vehicle such as an engine system and a cooling system, may increase. In some examples, the temperatures may increase substantially, leading to decreased power and overheating of the engine of the rail vehicle.

In one approach, heat rejection to the cooling system and tunnel may be reduced by adjusting an operating parameter such as engine exhaust gas recirculation (EGR) in response to an indication of tunneling operation based on ambient temperature, turbo inlet temperature, or engine oil temperature. As an example, an engine EGR amount may be substantially or completely reduced. In such an approach, however, the operating parameter may not be adjusted until the engine is far enough inside the tunnel for temperatures of various systems to have already increased. Further, if an engine EGR amount is completely reduced, emissions compliance may be compromised.

BRIEF DESCRIPTION

In one embodiment, an example method for an engine in a vehicle, the engine including an intake and an exhaust, includes determining the vehicle is under tunneling operation in response to one or more of an intake gas constituent and an exhaust gas constituent. Further, the method may include adjusting one or more operating parameters in response to the determination of tunneling operation, such as adjusting an engine EGR amount, fuel injection timing, boost level, and/or other parameters.

Such an approach takes advantage of the change in constituents in the ambient environment inside the tunnel as compared to outside the tunnel. Specifically, outside of the tunnel, intake gasses inducted into the engine are comprised substantially of ambient air, which has known constituent concentrations at a given barometric pressure, or altitude. As the vehicle enters the tunnel, where exhaust gas from other vehicles may be trapped, the constituent concentration of the intake gasses may change, thus also changing exhaust gas constituent concentrations. For example, higher levels of engine exhaust gas trapped in the tunnel may dilute the ambient air inducted by the engine in the tunnel. By detecting engine intake gas and/or exhaust gas constituent concentrations, tunneling operation of the vehicle may be indicated before a temperature of one or more components of a vehicle system of the vehicle increases. In this manner, one or more operating parameters may be adjusted before temperatures begin substantially increasing inside the tunnel. Further, an operating parameter such as an engine EGR amount may be adjusted responsive to the intake gas constituent concentrations, and as such, emissions compliance may be better maintained during tunneling operation.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 2 shows a schematic diagram of an example embodiment of a train including a plurality of rail vehicles.

FIG. 3 shows a schematic diagram of a train travelling through a tunnel.

DETAILED DESCRIPTION

The following description relates to various embodiments of methods and systems for an engine in a vehicle. In one embodiment, an example method includes determining an intake or exhaust gas constituent concentration passes a threshold concentration, and indicating the vehicle is under tunneling operation in response to the exhaust gas constituent concentration passing the threshold concentration. The method may further include adjusting one or more engine operating parameters in response to the indication of the tunneling operation. By detecting engine intake gas and/or exhaust gas constituent concentrations, tunneling operation of the vehicle may be identified sooner than if ambient temperature or engine oil temperature is used for indication of tunneling operation. In this way, one or more operating parameters may be adjusted sooner such that emissions compliance is better maintained while available power in the tunnel is increased and heat rejection to the tunnel is reduced. Alternatively, identifying tunnel operation through the engine intake gas and/or exhaust gas constituent concentrations can also be a more accurate indication of tunneling operation, and further may be a supplement to other tunnel detection techniques, such as the previously-mentioned temperature based identification.

The example tunnel detection and tunnel operation approaches described herein may be employed in a variety of engine types, and a variety of engine-driven systems, including semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example mobile platform supporting a system incorporating an embodiment of the invention.

Figure 1:
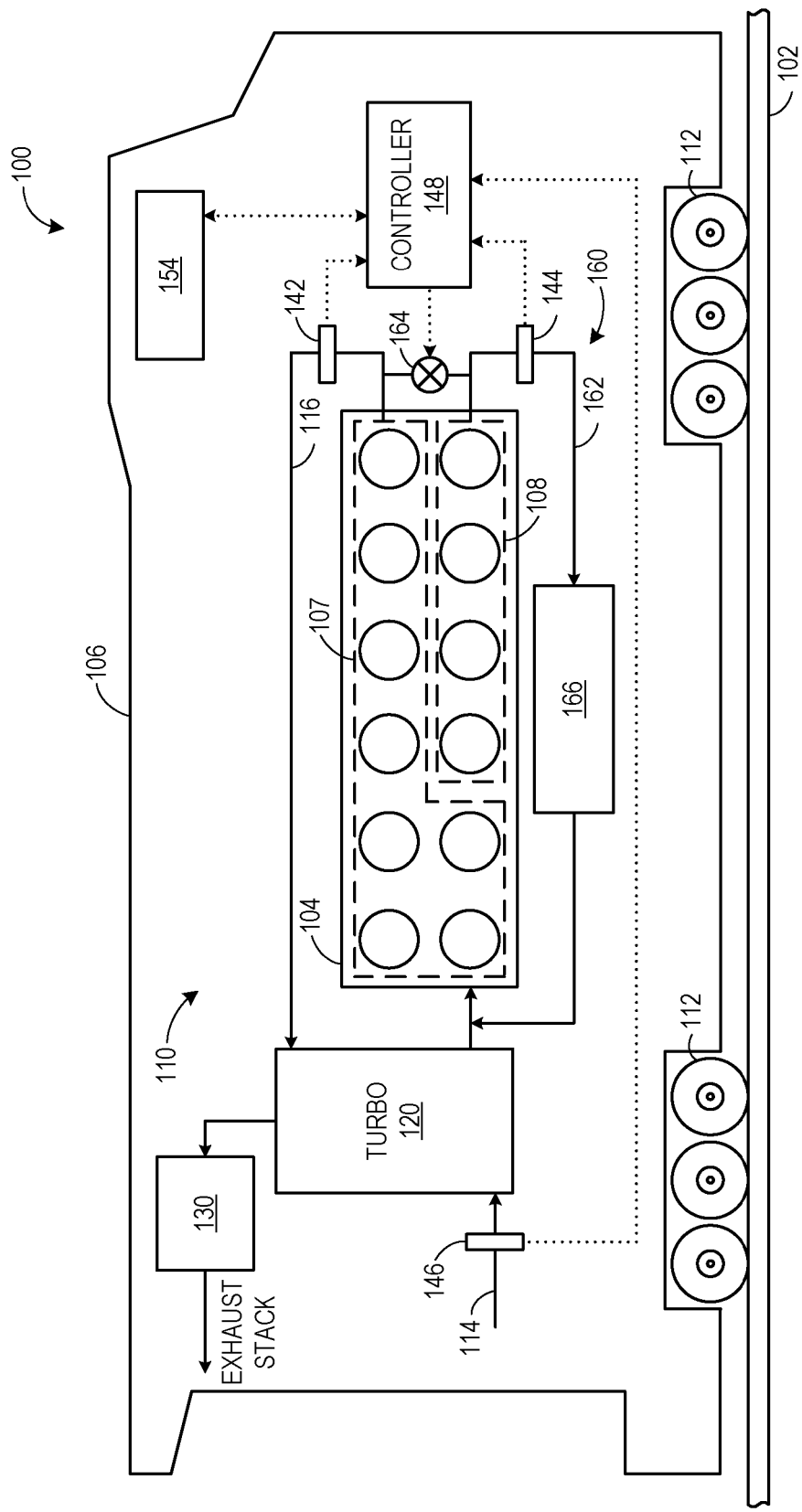
FIG. 1 shows a schematic diagram of an engine including an exhaust treatment system with a particulate filter.

Before further discussion of methods for tunneling operation, an example of a platform is disclosed in which the engine is positioned in a vehicle, such as a rail vehicle. For example, FIG. 1 shows a block diagram of an example embodiment of a vehicle system 100 (e.g., a locomotive system), herein depicted as a rail vehicle 106, configured to run on a rail 102 via a plurality of wheels 112. As depicted, the rail vehicle 106 includes an internal combustion engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake, such as intake passage 114. The intake may be any suitable conduit through which gases flow to enter the engine. For example, the intake may include an intake manifold, intake passages, and the like. The intake passage 114 receives ambient air from an air filter (not shown) that filters air from outside of the rail vehicle 106. Exhaust gas resulting from combustion in the engine 104 is supplied to an exhaust, such as exhaust passage 116. The exhaust may be any suitable conduit through which gases flow from the engine. For example, the exhaust may include an exhaust manifold, an exhaust passage, and the like. Exhaust gas flows through the exhaust passage 116, and out of an exhaust stack (not shown) of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In the example embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a group of non-donor cylinders 107, which includes eight cylinders, and a group of donor cylinders 108, which includes four cylinders. In other embodiments, the engine may include at least one donor cylinder and at least one non-donor cylinder. For example, the engine may have six donor cylinders and six non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 107 are coupled to the exhaust passage 116 to route exhaust gas from the engine to atmosphere (after it passes through an exhaust gas treatment system 130 and a turbocharger 120). The donor cylinders 108, which provide engine exhaust gas recirculation (EGR), are coupled exclusively to an EGR passage 162 of an EGR system 160 which routes exhaust gas from the donor cylinders 108 to the intake passage 114 of the engine 104, and not to atmosphere. By introducing exhaust gas to the engine 104, the amount of available oxygen for combustion is decreased, thereby reducing combustion flame temperatures and reducing the formation of nitrogen oxides (e.g., $NO_x$). In the example embodiment shown in FIG. 1, exhaust gas flowing from the donor cylinders 108 to the intake passage 114 passes through a heat exchanger such as an EGR cooler 166 to cool the exhaust gas before the exhaust gas returns to the intake passage.

Further, the EGR system 160 includes an EGR valve 164 disposed between the exhaust passage 116 and the EGR passage 162. The EGR valve 164 may be an on/off valve controlled by a controller 148, or it may control a variable amount of EGR, for example. In some examples, the EGR valve 164 may be actuated such that an EGR amount is reduced (exhaust gas flows from the EGR passage 162 to the exhaust passage 116). In other examples, the EGR valve 164 may be actuated such that the EGR amount is increased (e.g., exhaust gas flows from the exhaust passage 116 to the EGR passage 162). In some embodiments, the EGR system 160 may include a plurality of EGR valves to control the amount of EGR.

In other embodiments, the engine may not have any cylinders designated for EGR, for example, the engine may not include donor cylinders. In such a configuration, EGR may be routed to the intake passage from a location in the exhaust passage. In some examples, the amount of EGR may be controlled by one or more EGR valves disposed in an EGR passage between the intake passage and the exhaust passage.

In still other embodiments, the engine may not be configured for EGR. For example, the engine may not include any donor cylinders and the engine may not have a system which routes exhaust gas from the exhaust passage to the intake passage. In such an embodiment, however, the engine may still receive exhaust gas from the environment, such as during tunneling operation, as will be described below.

In some embodiments, the engine 104 may be configured to operate, at least part of the time, with a Miller cycle to increase a volumetric efficiency of the engine. In some examples, the engine may operate with a late Miller cycle in which intake valves (not shown) of the engine are held open during a portion of the compression stroke of the engine cycle. In other examples, the engine may operate with an early Miller cycle in which intake valve are closed relatively early (e.g., before bottom dead center of the intake stroke). In some examples, the intake and exhaust valves may be controlled by a variable valve timing actuator or actuation system. By operating the engine with a Miller cycle, nitrogen oxide ($NO_x$) emissions may be reduced, for example, due to a lower final charge temperature.

As depicted in FIG. 1, the engine system 110 includes a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include an intake compressor (not shown) which is at least partially driven by an exhaust turbine (not shown). While in this case a single turbocharger is included, the system may include multiple turbine and/or compressor stages.

The engine system 110 further includes an exhaust treatment system 130 coupled in the exhaust passage in order to reduce regulated emissions. As depicted in FIG. 1, the exhaust gas treatment system 130 is disposed downstream of the turbocharger 120. In other embodiments, an exhaust gas treatment system may be additionally or alternatively disposed upstream of the turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, various other emission control devices or combinations thereof.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors, as further elaborated herein, in order to determine operating parameters and operating conditions, and correspondingly adjust various engine actuators to control operation of the rail vehicle 106. For example, the controller 148 may receive signals from various engine sensors including, but not limited to, engine speed, engine load, boost pressure, exhaust pressure, ambient pressure, exhaust temperature, etc. Correspondingly, the controller 148 may control the vehicle system 100 by sending commands to various components such as traction motors, alternator, cylinder valves, throttle, etc.

As another example, the controller may receive signals from one or more intake gas constituent (e.g., O2, $NO_x$, $CO_2$, and the like) sensors 146 disposed in the intake passage 114 indicating intake gas constituent concentrations. The sensors 146 may be positioned at various positions in the intake passage 114, including upstream of the turbocharger 120 and/or downstream of the turbocharger's compressor, as well as upstream of the introduction of EGR and/or downstream of the introduction of EGR into the intake system. Additionally, the sensors 146 may be coupled to the intake of all cylinders of the engine, or a subset of engine cylinders, or a single cylinder of the engine.

The controller may further receive signals from one or more exhaust gas constituent (e.g., O2, $NO_x$, $CO_2$, and the like) sensors 142, 144 disposed in the exhaust passage and EGR passage, respectively indicating exhaust gas constituent concentrations. The exhaust sensors 142, 144 may be positioned at various locations in the exhaust passage 116, including upstream and/or downstream of the turbocharger's turbine, and/or upstream and/or downstream of the EGR takeoff. Additionally, the sensors 142, 144 may be coupled to the exhaust of all cylinders of the engine, or a subset of engine cylinders, or a single cylinder of the engine.

For example, ambient air (e.g., ambient air surrounding the vehicle when the vehicle is not operating in a tunnel) includes approximately 0% $NO_x$ and 21% $O_2$. During tunneling operation when a substantial amount of exhaust gas may be present in the ambient environment inside the tunnel, the intake gasses inducted by the engine may include additional exhaust gas (e.g., tunnel ambient exhaust gas recirculation/EGR) and thus increased $NO_x$ and reduced $O_2$ levels. This variation in the ambient gasses inducted by the engine may cause a concentration of $NO_x$ in the intake passage to increase and a concentration of $NO_x$ in the exhaust passage to decrease, and/or a concentration of $O_2$ in both the intake passage and in the exhaust passage to decrease. As will be described in greater detail below, in response to receiving a signal that an intake or exhaust gas concentration is too low or too high (e.g., above or below expected thresholds), tunneling operation may be indicated, and the controller 148 may adjust an operating parameter. For example, the controller 148 may adjust the EGR valve to reduce the EGR amount in response to indication of an $O_2$ concentration that is too low in the intake passage.

In another example, the controller 148 may estimate geographic coordinates of rail vehicle 106 using signals from positioning sensor, such as a Global Positioning System (GPS) receiver 154. Geographic coordinates of the vehicle 106 may be estimated or calculated. For example, a GPS signal from the GPS receiver 154 may be used to calculate the geographic coordinates of the vehicle. Geographic features in the path of the vehicle, such as the rail vehicle 106, may be signaled by an operator or calculated. For example, geographic coordinates of a set of predefined geographic features may be stored in a table. A distance between the vehicle and the set of predefined geographic features may be calculated so that the nearest geographic feature and its distance may be determined. Non-limiting examples of geographic features that may be stored in the set of predefined geographic features include a tunnel entrance, a steep grade, and a city boundary. Further, the GPS may include stored information about the predefined geographic features, such as length of a tunnel and grade of the tunnel.

In some embodiments, a software upgrade for the controller includes a non-transient, computer-readable medium including instructions which, when executed by a processor, identify tunnel conditions based on engine intake and/or exhaust gas constituent changes and/or control the rail vehicle to adjust one or more operating parameters when tunneling operation is indicated by one or more engine intake gas and/or exhaust gas constituent sensors. For example, the computer-readable medium may include instructions for receiving an intake gas or exhaust gas constituent concentration, and indicating tunneling operation when the intake gas and/or exhaust gas constituent concentration passes a threshold concentration. The computer-readable medium may further include instructions for, responsive to the indication of tunneling operation, adjusting one or more engine operating parameters, such as EGR amount and/or variable valve timing.

In some embodiments, an upgrade kit that may be installed in a rail vehicle may include a non-transient computer readable medium including instructions for identifying tunneling operation by one or more engine intake gas or exhaust gas constituent concentration sensors and/or adjusting one or more engine operating parameters in response to an indication of tunneling operation identified by one or more intake gas or exhaust gas constituent concentration sensors. The upgrade kit may further include one or more sensors or other mechanical elements, such as intake gas constituent concentration sensors, exhaust gas constituent concentration sensors, temperature sensors, and the like. Further, the upgrade kit may further include media with human-readable instructions for installing the additional sensors and/or software upgrade.

The rail vehicle 106 depicted in FIG. 1 may be one of a plurality of rail vehicles that make up a rail vehicle consist or train, such as the example train 200 shown in FIG. 2. The train 200 includes a plurality of rail vehicles such as locomotives 202, 204, 206 and a plurality of cars 208, configured to run on track 210. The plurality of locomotives 202, 204, 206 include a lead locomotive 202 and one or more remote locomotives 204, 206. While the depicted example shows three locomotives and four cars, any appropriate number of locomotives and cars may be included in train 200. Further, in the example of FIGS. 2-3, the train is travelling to the right, although the train may travel in either direction.

The locomotives 202, 204, 206 are powered by an engine 214, while cars 208 may be non-powered. In one example, locomotives 202, 204, 206 may be diesel-electric locomotives powered by diesel engines. However, in alternate embodiments, the locomotives may be powered with an alternate engine configuration, such as a gasoline engine, a biodiesel engine, a natural gas engine, or wayside (e.g., catenary, or third-rail) electric, for example.

The locomotives 202, 204, 206 and cars 208 are coupled to each other through couplers 212. While the depicted example illustrates locomotives 202, 204, 206 connected to each other through interspersed cars 208, in alternate embodiments, the one or more locomotives may be connected in succession, as a consist, while the one or more cars 208 may be coupled to a remote locomotive (that is, a locomotive not in the lead consist) in succession.

Each locomotive may include a locomotive controller 218 configured to receive information from, and transmit signals to, each of the locomotives of train 200. Further, each locomotive controller 218 may receive signals from a variety of sensors on train 200, and adjust train operations accordingly. Each locomotive controller 218 may be coupled to an engine controller 216, such as the controller 148 described above with reference to FIG. 1, for adjusting engine operations of each locomotive. As elaborated with reference to FIGS. 4-5, each engine controller 216 may receive a signal indicating an exhaust gas constituent (e.g., $NO_x$) concentration is less than a threshold concentration. In response, each engine controller 216 may determine that the locomotive is operating in a tunnel, and each engine controller 216 may adjust one or more engine operating parameters.

FIG. 3 shows an example of a train 300, such as the train 200 described with reference to FIG. 2, with a plurality of locomotives 302, 304, and 306, and a plurality of cars, operating in a tunnel 310. During tunneling operation, the engine controller may adjust engine operating parameters on a per locomotive basis. For example, an EGR amount may be reduced in one locomotive, while the EGR amount is not reduced in another locomotive.

As shown, a leading locomotive 302 is the first locomotive in the train to enter the tunnel. Because there are no locomotives in front of the leading locomotive 302, the leading locomotive 302 may operate with cooler temperatures and may ingest less exhaust gas than the remote locomotives 304 and 306. As such, intake gas and exhaust gas constituent concentrations may not change as much or as quickly in the leading locomotive 302 as compared to the remote locomotives 304 and 306. Thus, tunneling operation may not be indicated until the leading locomotive 302 is farther inside the tunnel, and an engine EGR amount and/or variable valve timing may be adjusted less or later in the leading locomotive 302. In some examples, depending on the length of the tunnel, for example, tunneling operation may not be indicated in the leading locomotive 302.

In contrast, when the remote locomotive 306 enters the tunnel 310, a temperature of the remote locomotive 306 may increase relatively quickly and the remote locomotive 306 may ingest a substantial amount of exhaust gas (e.g., tunnel ambient EGR), as there are two locomotives ahead of the remote locomotive 306. Thus, intake gas and exhaust gas constituent concentration sensors may signal a change in constituent concentration not long after the remote locomotive 306 enters the tunnel. As such, an engine EGR amount of the remote locomotive 306 may be substantially reduced or even reduced to zero once the remote locomotive 306 enters the tunnel 310.

Thus, engine operating parameters may be determined on an individual locomotive basis during tunneling operation. In this manner, one locomotive may be operating with a relatively high engine EGR amount while another locomotive is operating with an engine EGR amount of zero.

Figure 4:
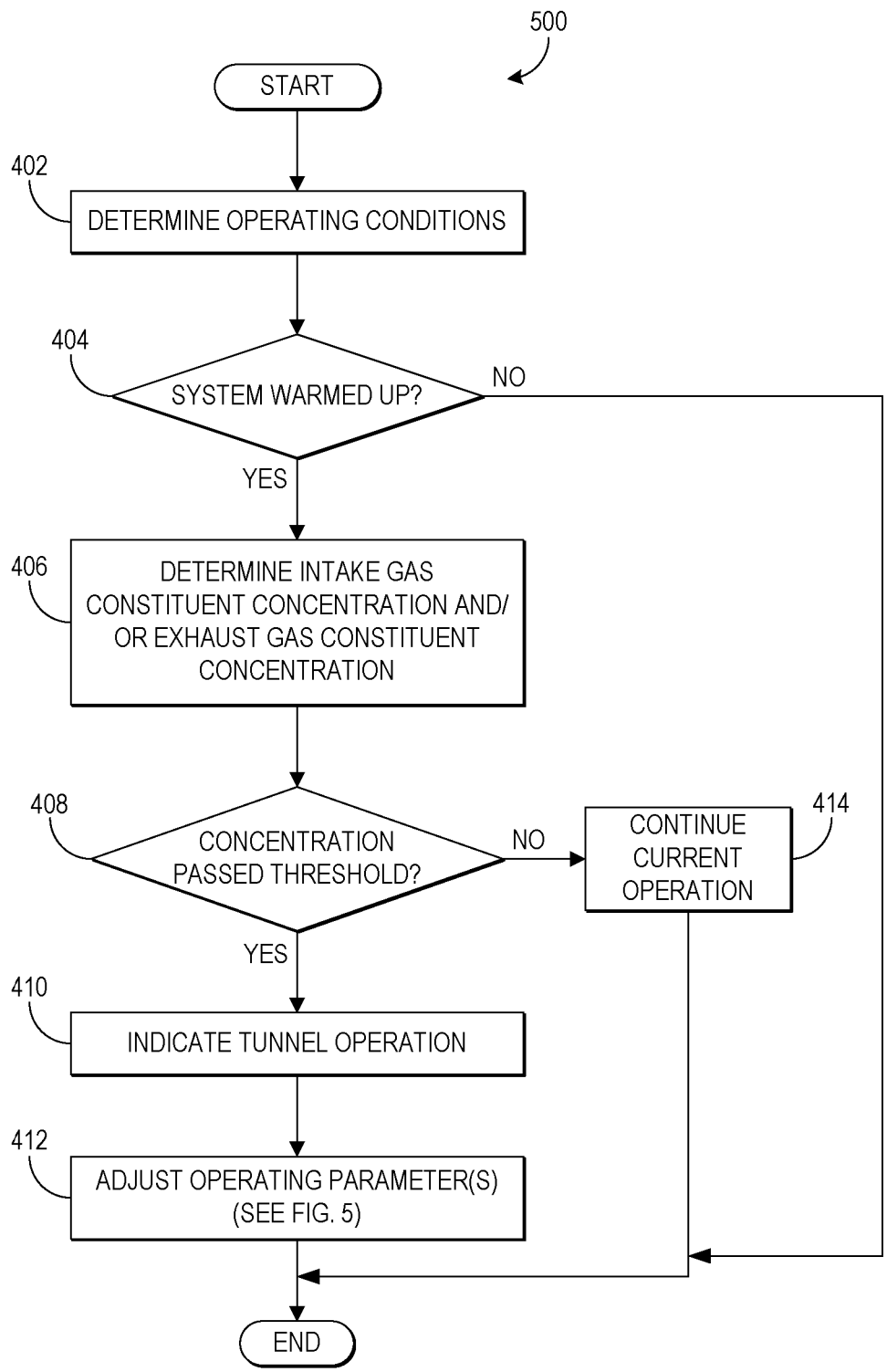
FIG. 4 shows a flow chart illustrating a method for indicating tunneling operation of a vehicle.
Figure 5:
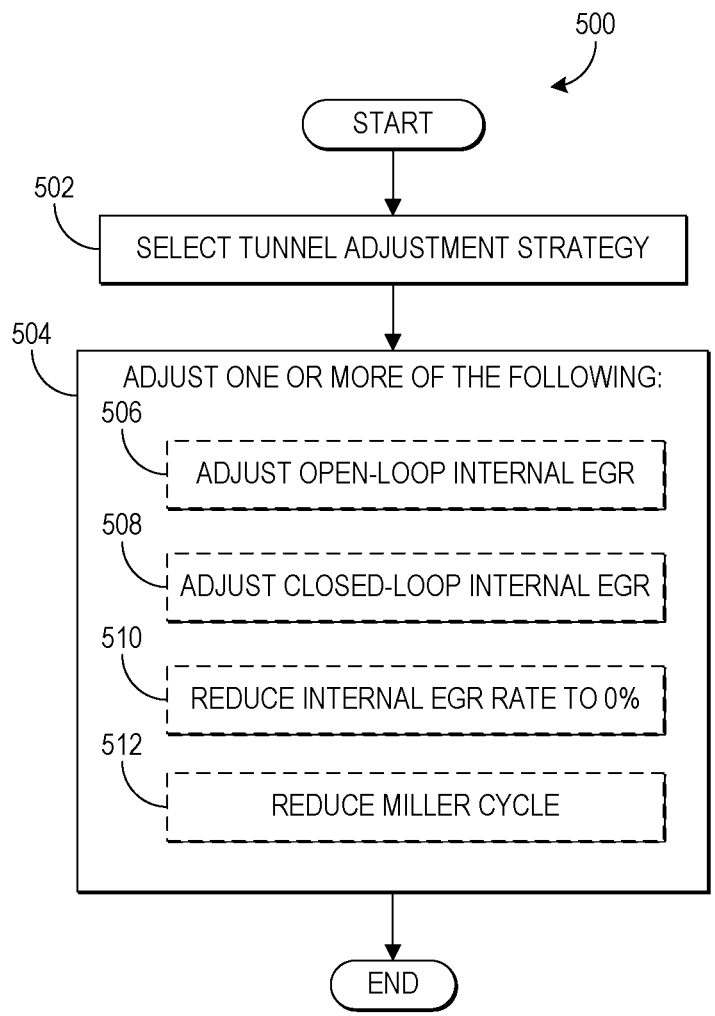
FIG. 5 shows a flow chart illustrating a method for adjusting one or more operating parameters during tunneling operation of a vehicle.

FIGS. 4-5 show flow charts illustrating methods for operating an engine in a vehicle, such as the rail vehicle 106 described above with reference to FIG. 1. A method for indicating tunneling operation based on signals received from intake gas and/or exhaust gas constituent concentration sensors is depicted in FIG. 4. FIG. 5 shows a method for adjusting one or more operating parameters in response the indication of tunneling operation. Operating parameters may include engine operating conditions, vehicle speed, and the like.

FIG. 4 shows a flow chart illustrating a method 400 for determining if a vehicle is operating in a tunnel. Specifically, the method determines if an intake gas constituent concentration or an exhaust gas constituent concentration has passed a threshold indicating that the engine is ingesting exhaust gas, which occurs when a vehicle travels though a confined space such as a tunnel.

At 402, operating conditions are determined. The operating conditions may include engine temperature, ambient temperature, air-fuel ratio, and the like.

At 404, it is determined if the vehicle system is warmed up. Warmed up implies various components of the vehicle system, including the engine and various sensors, have warmed up to respective operating temperatures. As an example, intake and exhaust gas sensors may need to reach a light-off temperature before their output is accurate. If it is determined the vehicle system is not warmed up, the method ends. In some embodiments, when the vehicle system is not warmed up, tunneling operating may be indicated by a GPS signal, air, oil, or water temperature, rate of temperature rise, and/or turbocharger inlet air temperature.

On the other hand, if the system is warmed up, the method continues to 406 where an intake gas constituent concentration and/or an exhaust gas constituent concentration is determined. As an example, the intake gas constituent may be NO or $O_2$. Likewise, the exhaust gas constituent may be $NO_x$ or $O_2$. As described above, ambient air outside a tunnel generally has a $NO_x$ concentration of ~0% and an $O_2$ concentration of ~21%. When a vehicle enters a tunnel and exhaust gas is ingested, a concentration of $NO_x$ in the intake passage may increase (e.g., exceed a threshold intake $NO_x$ concentration), and a concentration of $O_2$ in the intake passage may decrease (e.g., fall below a threshold intake $O_2$ concentration). Further, concentrations of NO and $O_2$ in the exhaust passage may decrease (e.g., fall below respective threshold exhaust concentrations). In other examples, intake gas and exhaust gas concentrations of carbon dioxide ($CO_2$) may be additionally or alternatively used to determine the vehicle is traveling through a tunnel. Thus, when it is determined that one or more of an intake gas constituent concentration or an exhaust gas constituent concentration passes a threshold concentration at 408, tunneling operation is indicated at 410, for example, via a display in the vehicle and/or via a coded message transmitted to a controller, such as a locomotive controller 218 of the vehicle or another vehicle coupled to the vehicle in a consist. For example, while multiple vehicles in a consist may include an operating engine, only some of the vehicles may include upgrades to identify tunneling operation. As such, the upgraded vehicles may communicate with other non-upgraded vehicles in the consist to indicate tunneling operation. The other non-upgraded vehicle can then take action (e.g., reducing EGR amount) based on the tunnel indication, as well as its position relative to the vehicle that has identified the tunnel operation.

In some examples, tunneling operation may be identified based on a combination of intake $NO_x$ and $O_2$ passing a threshold. In other examples, a combination of exhaust $NO_x$ and $O_2$ may pass a threshold. The threshold may be a constant value, or the threshold may be variable as a function of other parameters, such as altitude and/or barometric pressure.

If, instead, it is determined that the intake gas constituent concentration and/or the exhaust gas constituent concentration have not passed respective threshold concentrations, the method moves to 414 and current engine operation is continued.

Once tunneling operation is indicated at 410, the method proceeds to 412 where one or more operating parameters, such as variable valve timing and EGR amount, are adjusted. In some examples, variable valve timing may be adjusted such that an intake valve closing timing is advanced to reduce late Miller cycle engine operation. In other examples, variable valve timing may be adjusted such that an intake valve closing timing is retarded to reduce early Miller cycle engine operation. In still other examples, an EGR amount may be adjusted, as will be described below with reference to FIG. 5. For example, EGR amount may be adjusted via an open-loop or closed-loop feedback. In still other examples, variable valve timing may be adjusted and an EGR amount may be adjusted.

Thus, one or more intake gas constituent concentration sensors and/or exhaust gas constituent concentrations sensors may be used to indicate tunneling operation of a vehicle. Responsive to the indication of tunneling operation of the vehicle, one or more operating parameters may be adjusted. In this manner, operating parameters that are adjusted in one vehicle in a train or rail vehicle consist may not be adjusted or may be adjusted differently in another vehicle of the train or rail vehicle consist. As an example, operating parameters in a leading vehicle of a train may not be adjusted in a tunnel while one or more operating parameters in a remote vehicle of the train may be adjusted almost as soon as the remote vehicle enters the tunnel. As such, tunnel performance of the vehicle and/or train may be improved.

FIG. 5 shows a method 500 for adjusting one or more operating parameters once tunneling operating of a vehicle is indicated (FIG. 4). Specifically, the method adjusts one or more operating parameters based on a tunnel adjustment strategy. As described above, tunneling operation may be indicated by one or more of exhaust gas constituent sensors, air, oil, and/or water temperatures, rate of temperature rise, GPS signals, turbocharger inlet temperature, or the like.

At 502, a tunnel adjustment strategy is selected. The tunnel adjustment strategy may be based on operating conditions of the vehicle, such as temperature of various vehicle components (e.g., engine, heat exchangers, etc.), ambient temperature, tunnel ambient EGR amount, and the like.

At 504, one or more operating parameters are adjusted based on the tunnel adjustment strategy. The operating parameters include open-loop engine EGR at 506, closed-loop engine EGR at 508, reducing the engine EGR amount to 0% at 510, and reducing Miller cycle operation at 512.

In some embodiments, reduction of engine EGR amount and/or reduction of Miller cycle operation may occur based on an operating parameter, such as an engine or air-handling limitation or protection parameter. As an example, the operating parameter may be flow through the turbocharger compressor. As engine EGR and/or Miller cycle operation are reduced, flow through the compressor of the turbocharger increases, resulting in the compressor moving toward choke on a compressor map. Thus, the amount of engine EGR and/or Miller cycle operation may be reduced may be limited by a maximum allowable flow through the compressor such that compressor degradation is reduced. In one example, instead of reducing engine EGR from 30% to 0% during tunneling operation, engine EGR may only be reduced from 30% to 10% based on an engine or air-handling limitation or protection parameter.

Open-loop engine EGR may be reduced as determined by engine testing such that emissions compliance is maintained while available power in the tunnel is increased and heat rejection to the tunnel is reduced. For example, by reducing engine EGR, heat rejection to the tunnel from the EGR cooler is reduced. Open-loop adjustment of EGR may not include sensing a total EGR amount (e.g., engine and tunnel ambient EGR amount). As an example, the engine EGR amount may be reduced by a predetermined or constant amount when tunneling operating is indicated. As another example, the engine EGR may be reduced by a variable amount which may be a function of a surrogate to tunnel ambient EGR, such as measured ambient temperature, measured turbocharger inlet temperature, estimated time or distance into tunnel along with a knowledge of the locomotive's position in the train, and the like. It should be noted that this method does not require intake or exhaust gas constituent sensors.

Closed-loop engine EGR may be reduced based on $NO_x$ or $O_2$ sensor feedback such that emissions compliance is maintained while available power in the tunnel is increased and heat rejection to the tunnel is reduced. For example, engine EGR may be reduced proportional to or relative to a tunnel ambient EGR amount detected by intake $NO_x$ or $O_2$ sensors.

Closed-loop engine EGR adjustment may be carried out in two approaches. In the first approach, the system may continually adapt to desired emissions output closed-loop, regardless of tunnel operation. In such an example, an exhaust $NO_x$ sensor may be used, as exhaust $NO_x$ is the regulated emissions of concern. In the second approach, the system may only adapt once the tunnel is detected. Using a GPS system, for instance, may arm the control system to adjust parameters differently than during non-tunnel operation to take advantage of tunnel ambient EGR. A GPS system may let the engine controller know a tunnel is coming before it ever gets inside it, whereas other tunnel detector indicators, such as intake or exhaust gas constituent sensors, are reactive and indicate tunneling operation only once the vehicle is inside a tunnel.

The second approach has an advantage that after exiting the tunnel, the controls can "zero-out" the tunnel adjustment instead of more slowly re-adapting to normal non-tunnel conditions. Another advantage of only adapting inside tunnels is that other sensors besides exhaust $NO_x$ could be used if a correlation is created between output from the other sensors and exhaust $NO_x$ in tunnels. The classification of these other sensor methods (intake $NO_x$, intake/exhaust $O_2$, intake/exhaust $CO_2$, etc) may be as open-loop instead of closed-loop, as these are clear indicators of tunnel operation and tunnel ambient EGR, but they are not directly associated with the parameter of concern: exhaust $NO_x$. Because of this, additional analysis may be used to correlate these other parameters with the total level of EGR (and ultimately exhaust $NO_x$), and may include other sensed and/or commanded parameters in the correlation. As an example, the controller may be commanding multiple actuators to drive toward what the controller would normally expect to be 30% EGR, but sensor feedback (e.g., $O_2$, $NO_x$, $CO_2$, etc) is indicating that the estimated total (e.g., engine plus tunnel ambient) EGR rate is more like 40% EGR. Therefore, the controller reduces the command to an engine EGR rate of 20% so the estimated total EGR rate is 30%.

In some embodiments, the engine EGR amount may be reduced to 0% (e.g., turned off completely) to maximize available power in the tunnel and to minimize heat rejection to the tunnel from the EGR system.

In some examples, the engine EGR amount may be reduced by adjusting the EGR valve. For example, the EGR valve may be adjusted such that some of the exhaust gas in the EGR passage is routed to the exhaust passage before it enters the EGR cooler. In other examples, the engine EGR amount may be reduced by reducing fueling to donor cylinders of the engine and/or increasing fueling to non-donor cylinders of the engine. For example, one or more donor cylinders may be skip-fired such that the exhaust gas from the skip-fired donor cylinders may be substantially comprised of gas inducted into the cylinder, and a temperature of the exhaust gas may be substantially reduced as combustion did not occur. In some examples, fueling may be reduced in each of the donor cylinders. In other examples, fueling to one or more of the donor cylinders may be cut (e.g., reduced completely). In still other examples, fueling may be cut to a subset of donor cylinders. In this manner, heat rejection from the EGR cooler (e.g., a heat load of the EGR cooler) may be reduced.

Miller cycle operation of the engine may be reduced by adjusting variable valve timing such that available power in the tunnel is increased and heat rejection to the tunnel is reduced. For example, Miller cycle operation may be reduced by advancing a timing of intake valve closing in one or more cylinders of the engine. When Miller cycle operation is reduced, an amount of NO, generated during combustion may be decreased. However, tunnel ambient EGR may compensate for the increased amount of $NO_x$ such that emissions are not increased. Thus, Miller cycle operation may be reduced based on a tunnel ambient EGR amount detected by $NO_x$ or $O_2$ sensors. Further, in some examples, turbo boost may be reduced while Miller cycle operation is reduced.

In one example, the operating parameters may be adjusted individually. For example, one operating parameter may be adjusted. In another example, a combination of operating parameters may be adjusted at one time or individually in a particular order. As an example, open-loop engine EGR and Miller cycle operation may be reduced in response to an indication of tunneling operation. As another example, closed-loop EGR may be reduced to maintain emissions compliance, but as thermal limits are reached, the engine EGR amount may be reduced to 0%.

Thus, in response to an indication of tunneling operation, one or more operating parameters may be adjusted to reduce heat rejection to the tunnel. By reducing heat rejection to the tunnel, overheating of the vehicle system may be reduced. Further, by adjusting the one or more operating parameters responsive to an indication of EGR detected by $NO_x$ or $O_2$ sensors in the intake or exhaust, emissions compliance of the vehicle may be maintained.

An embodiment relates to a method for an engine in a vehicle; the engine has an intake and an exhaust. The method comprises carrying out a determination (e.g., an automatic determination) of whether the vehicle is under tunneling operation in response to (e.g., based on) one or more of an intake gas constituent or an exhaust gas constituent. The method further comprises controlling the vehicle, e.g., controlling the engine of the vehicle from one state or mode of operation to another, different state or mode of operation, based on the determination. The step of controlling the vehicle may comprise adjusting one or more operating parameters in response to the determination of tunneling operation.

Another embodiment relates to a tangible medium that stores one or more non-transitory electronically-readable sets of instructions that when accessed and executed by an electronic device (e.g., processor) cause the electronic device to do the following, according to the contents of the one or more sets of instructions, either by the electronic device itself or the electronic device controlling or otherwise communicating with other systems and devices: carry out a determination of whether a vehicle is under tunneling operation in response to (e.g., based on) one or more of an intake gas constituent or an exhaust gas constituent associated with an engine of the vehicle; and control the vehicle, e.g., from one state or mode of operation to another, different state or mode of operation, based on the determination. Control of the vehicle may comprise generating control signals for adjusting one or more operating parameters in response to the determination of tunneling operation.

In another embodiment of a method for an engine in a vehicle (e.g., a method for controlling the engine), the method comprises determining if an intake gas constituent concentration or an exhaust gas constituent concentration passes a threshold concentration. The method further comprises generating an indication that the vehicle is under tunneling operation in response to one or more of the intake gas constituent concentration or the exhaust gas constituent concentration passing the threshold concentration. The method further comprises reducing an engine exhaust gas recirculation amount in response to the indication of tunneling operation.

Another embodiment relates to a tangible medium that stores one or more non-transitory electronically-readable sets of instructions that when accessed and executed by an electronic device (e.g., processor) cause the electronic device to do the following, according to the contents of the one or more sets of instructions, either by the electronic device itself or the electronic device controlling or otherwise communicating with other systems and devices: determine if an intake gas constituent concentration or an exhaust gas constituent concentration (of an engine of a vehicle) passes a threshold concentration; generate an indication that the vehicle is under tunneling operation in response to one or more of the intake gas constituent concentration or the exhaust gas constituent concentration passing the threshold concentration; and reduce an engine exhaust gas recirculation amount in response to the indication of tunneling operation.

In another embodiment of a method for an engine in a vehicle, the method comprises determining a parameter relating to tunnel ambient exhaust gas recirculation ingested by the engine. The parameter may be an amount of the tunnel ambient exhaust gas recirculation, e.g., a concentration of the tunnel ambient exhaust gas recirculation, or a respective concentration of one or more constituents of tunnel ambient exhaust gas recirculation. The method further comprises controlling the engine, or another system of the vehicle, based on the parameter.

Another embodiment relates to a tangible medium that stores one or more non-transitory electronically-readable sets of instructions that when accessed and executed by an electronic device (e.g., processor) cause the electronic device to do the following, according to the contents of the one or more sets of instructions, either by the electronic device itself or the electronic device controlling or otherwise communicating with other systems and devices: determine a parameter relating to tunnel ambient exhaust gas recirculation ingested by an engine of a vehicle; and control the engine, or another system of the vehicle, based on the parameter. The parameter may be an amount of the tunnel ambient exhaust gas recirculation, e.g., a concentration of the tunnel ambient exhaust gas recirculation, or a respective concentration of one or more constituents of tunnel ambient exhaust gas recirculation.

In another embodiment of a method for an engine in a vehicle, the method comprises determining if an intake gas constituent concentration or an exhaust gas constituent concentration passes a threshold concentration. (The method may comprise both determining if the intake gas constituent concentration passes a first threshold concentration and if the exhaust gas constituent concentration passes a second threshold concentration.) The method further comprises generating a control signal, indicative of the vehicle being under tunneling operation, in response to one or more of the intake gas constituent concentration or the exhaust gas constituent concentration passing the threshold concentration. The method further comprises reducing an engine exhaust gas recirculation amount in response to the control signal. In another embodiment, the control signal is generated if the intake gas constituent concentration passes the first threshold concentration or if the exhaust gas constituent concentration passes the second threshold concentration. In another embodiment, the control signal is generated only if the intake gas constituent concentration passes the first threshold concentration and if the exhaust gas constituent concentration passes the second threshold concentration.

Another embodiment relates to a tangible medium that stores one or more non-transitory electronically-readable sets of instructions that when accessed and executed by an electronic device (e.g., processor) cause the electronic device to do the following, according to the contents of the one or more sets of instructions, either by the electronic device itself or the electronic device controlling or otherwise communicating with other systems and devices: determine if an intake gas constituent concentration or an exhaust gas constituent concentration (of an engine of a vehicle) passes a threshold concentration (the instructions may cause the electronic device to determine if the intake gas constituent concentration passes a first threshold concentration and if the exhaust gas constituent concentration passes a second threshold concentration); generate a control signal, indicative of the vehicle being under tunneling operation, in response to one or more of the intake gas constituent concentration or the exhaust gas constituent concentration passing the threshold concentration; and reduce, or cause to be reduced, an engine exhaust gas recirculation amount in response to the control signal. In another embodiment, the one or more sets of instructions are configured, when executed by the electronic device, to cause the electronic device to generate the control signal if the intake gas constituent concentration passes the first threshold concentration or if the exhaust gas constituent concentration passes the second threshold concentration. In another embodiment, the one or more sets of instructions are configured, when executed by the electronic device, to cause the electronic device to generate the control signal only if the intake gas constituent concentration passes the first threshold concentration and if the exhaust gas constituent concentration passes the second threshold concentration.

Another embodiment relates to a system for a vehicle. The system comprises an engine; the engine includes one or more donor cylinders and a plurality of non-donor cylinders. The system further comprises an engine exhaust gas recirculation system coupled to the engine to route engine exhaust from the one or more donor cylinders to an intake passage of the engine. The system further comprises an intake gas constituent sensor disposed in the intake passage and an exhaust gas constituent sensor disposed in an exhaust passage of the engine. The system further comprises a controller. The controller is configured to identify an intake gas constituent concentration via the intake gas constituent sensor, e.g., the intake gas constituent concentration is identified based on a first signal received from the intake gas constituent sensor. The controller is further configured to identify an exhaust gas constituent concentration via the exhaust gas constituent sensor, e.g., the exhaust gas constituent concentration is identified based on a second signal received from the exhaust gas constituent sensor. The controller is further configured to generate a control signal, indicative of a tunneling operation of the vehicle, in response the intake gas constituent concentration and/or the exhaust gas constituent concentration passing a threshold concentration. For example, the controller may be configured to generate the control signal if the intake gas constituent concentration passes a first threshold concentration, or if the exhaust gas constituent concentration passes a second threshold concentration. As another example, the controller may be configured to generate the control signal only if the intake gas constituent concentration passes the first threshold concentration and if the exhaust gas constituent concentration passes the second threshold concentration. The controller is further configured to reduce an engine exhaust gas recirculation amount in response to, or based on, the control signal. Although embodiments herein are illustrated as relating to engines having donor cylinder(s) and non-donor cylinder(s), other embodiments are applicable to engines generally, e.g., engines not having donor cylinders. For example, in one embodiment of a method, an engine includes no EGR system, and the method comprises controlling the engine, or a vehicle in which the engine is operably disposed, based on measurements of tunnel ambient exhaust gas recirculation received at the intake of the engine. As another example, in another embodiment of a method, an engine includes no donor cylinders, but does include an EGR system that is controllable (e.g., by controlling a valve fluidly disposed in an EGR line) to selectively divert common engine exhaust to an intake of the engine. The method comprises controlling the EGR system of the engine based on a determination that the vehicle is under tunneling operation, in response to one or more of an intake gas constituent or an exhaust gas constituent of the engine.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling an engine in a vehicle via an electronic device, the engine having an intake and an exhaust, comprising:
   determining if the vehicle is under tunneling operation in response to an intake gas constituent;
   if tunneling operation is not confirmed, adjusting an engine exhaust gas recirculation amount in response to exhaust nitrogen oxide concentration; and
   if tunneling operation is confirmed, adjusting the engine exhaust gas recirculation amount to zero percent.

2. The method of claim 1, wherein the intake gas constituent is oxygen, and wherein the determination of tunneling operation is based on an oxygen concentration in the intake of the engine falling below a threshold oxygen concentration.

3. The method of claim 1, wherein the intake gas constituent is nitrogen oxide, and wherein the determination of tunneling operation is based on a nitrogen oxide concentration in the intake of the engine exceeding a threshold nitrogen oxide concentration.

4. The method of claim 1, wherein the determination of tunneling operation is further based on an oxygen concentration in the exhaust of the engine falling below a threshold oxygen concentration.

5. The method of claim 1, wherein the determination of tunneling operation is further based on a nitrogen oxide concentration in the exhaust of the engine falling below a nitrogen oxide threshold concentration.

6. The method of claim 1, further comprising adjusting variable valve timing if tunneling operation is confirmed.

7. The method of claim 1, further comprising determining a tunnel ambient exhaust gas recirculation amount based on a concentration of the intake gas constituent, and wherein adjusting the engine exhaust gas recirculation amount includes reducing the engine exhaust gas recirculation amount proportional to or relative to an increase in the tunnel ambient exhaust gas recirculation amount.

8. A method for an engine in a vehicle, comprising:
  determining if an intake gas constituent concentration passes a threshold concentration;
  indicating the vehicle is under tunneling operation in response to the intake gas constituent concentration passing the threshold concentration; and
  reducing an engine exhaust gas recirculation amount in response to the indication of tunneling operation.

9. The method of claim 8, further comprising advancing a closing timing of an intake valve of the engine in response to the indication of tunneling operation.

10. The method of claim 8, further comprising determining a tunnel ambient exhaust gas recirculation amount based on the intake gas constituent concentration or an exhaust gas constituent concentration.

11. The method of claim 10, further comprising reducing the engine exhaust gas recirculation amount proportional to or relative to an increase in the tunnel ambient exhaust gas recirculation amount.

12. The method of claim 8, wherein an intake gas constituent is one of oxygen, nitrogen oxide, or carbon dioxide.

13. The method of claim 8, further comprising reducing the engine exhaust gas recirculation amount by a predetermined amount.

14. The method of claim 8, further comprising reducing the engine exhaust gas recirculation amount based on an operating parameter.

15. A system for a vehicle, comprising:
  an engine, the engine including one or more donor cylinders and a plurality of non-donor cylinders;
  an engine exhaust gas recirculation system coupled to the engine to route engine exhaust from the one or more donor cylinders to an intake passage of the engine;
  an intake gas constituent sensor disposed in the intake passage;
  an exhaust gas constituent sensor disposed in an exhaust passage of the engine; and
  a controller configured to identify an intake gas constituent concentration via the intake gas constituent sensor and an exhaust gas constituent concentration via the exhaust gas constituent sensor, to indicate tunneling operation of the vehicle in response to one or more of the intake gas constituent concentration and the exhaust gas constituent concentration passing a threshold concentration, and to reduce an engine exhaust gas recirculation amount in response to the indication of tunneling operation.

16. The system of claim 15, wherein the engine is configured for Miller cycle operation, and the controller is further configured to adjust variable valve timing to reduce the Miller cycle operation in response to the indication of tunneling operation.

17. The system of claim 16, wherein the controller is further configured to reduce the Miller cycle operation based on an operating parameter.

18. The system of claim 15, wherein the engine exhaust gas recirculation system includes at least one exhaust gas recirculation valve, and the controller is configured to adjust the at least one exhaust gas recirculation valve to reduce the engine exhaust gas recirculation amount.

19. The system of claim 15, wherein the controller is further configured to adjust fueling of the one or more donor cylinders to reduce the engine exhaust gas recirculation amount.

20. The system of claim 15, wherein the intake gas constituent sensor is configured to detect nitrogen oxide or oxygen, and wherein the exhaust gas constituent sensor is configured to detect nitrogen oxide or oxygen.

21. The method of claim 1, wherein adjusting the engine exhaust gas recirculation amount in response to exhaust nitrogen oxide concentration comprises performing a closed-loop exhaust gas recirculation valve position adjustment based on feedback from a nitrogen oxide sensor.

22. The method of claim 1, further comprising, after the tunneling operation is complete, resuming a predetermined non-tunneling engine exhaust gas recirculation amount.

* * * * *